May 12, 1970   F. B. VANDERHOOF   3,511,357
CONVEYOR SWITCHING DEVICE
Filed April 8, 1968                          2 Sheets-Sheet 1

FRANK B. VANDERHOOF
INVENTOR

BY *Ralph E. Bitner*
ATTORNEY

May 12, 1970  F. B. VANDERHOOF  3,511,357
CONVEYOR SWITCHING DEVICE
Filed April 8, 1968  2 Sheets-Sheet 2
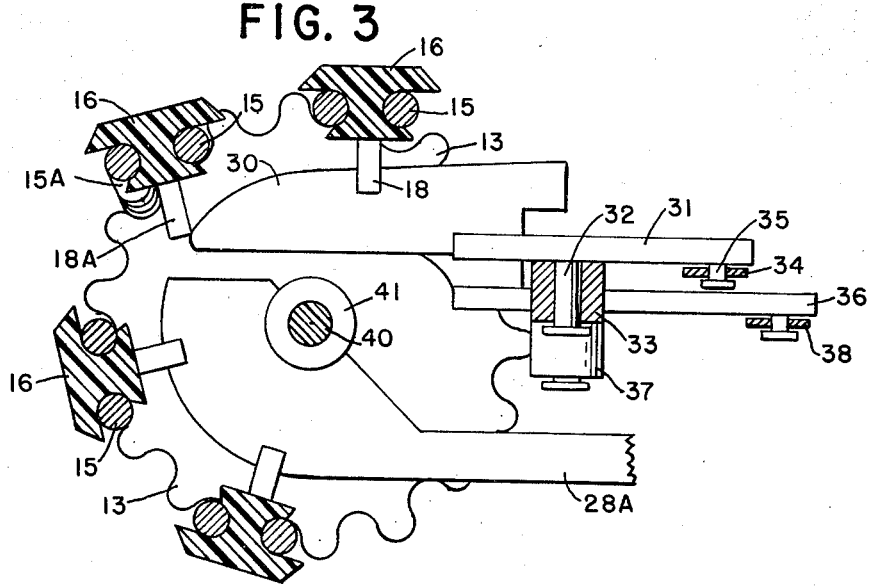
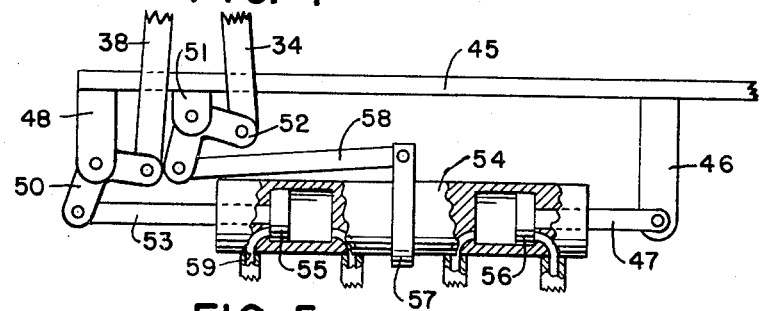
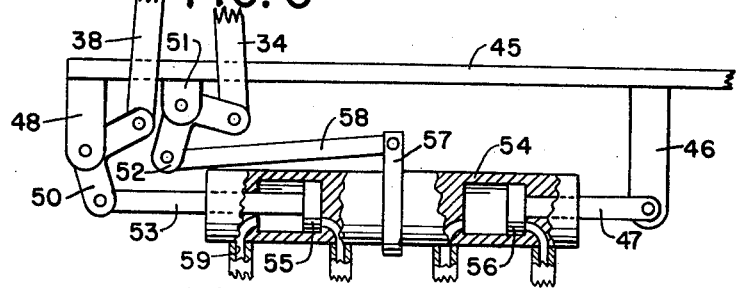
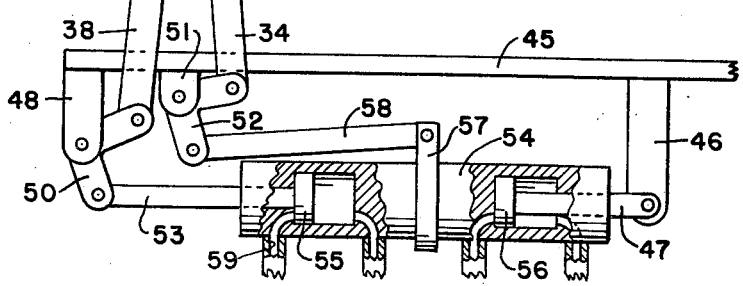

United States Patent Office 3,511,357
Patented May 12, 1970

3,511,357
CONVEYOR SWITCHING DEVICE
Frank B. Vanderhoof, Lake Hopatcong, N.J., assignor to Scale Specialties Co., Boonton, N.J., a corporation of New Jersey
Filed Apr. 8, 1968, Ser. No. 719,564
Int. Cl. B65g 47/26
U.S. Cl. 198—31                    3 Claims

ABSTRACT OF THE DISCLOSURE

A switching device for separating packages of merchandise or similar articles into a plurality of groups. The separation is controlled by some particular property of the articles, such as weight, and the separation is made by switching supporting carriers away from a normal path on a conveyor. The selection of the carriers is made prior to the deposition of the packages on the carrier supports so that any interference between the switching blades and the carrier followers can be rectified.

BACKGROUND OF THE INVENTION

This invention relates to a high speed separation means wherein carriers supporting packages are separated into groups. The invention has particular relationship to the operation of switching blades which make contact with cam follower studs positioned below the carrier supporting plane. Due to the high speed of operation and other variable characteristics, there may be interference between the switch blades and the carrier studs. Rectification of this interference is made possible by the disposition of the interfering components and by the resilience of the supporting rods.

The invention relates to improvements on the machine of the type shown in application Ser. No. 305,385, filed Aug. 29, 1963, now Pat. No. 3,190,432, issued June 22, 1965 and assigned to the same assignee as the present application.

Conveyor switching devices are old in the art and are now being used for receiving discrete packages and dividing them into three or more groups. Generally, the division into groups is made on the basis of weight and each group comprises packages within a predetermined weight range. It has been found that most prior art switching devices are subject to certain errors, particularly when the device is run at high speed. The most common error results when a portion of a switching blade makes contact with the end of the cam follower attached to a carrier. When this occurs, the carrier may be broken, the switching blade may be bent, or the carrier supporting plane may be tilted so as to spill the contents of the package or to move the package to the wrong group.

The present invention avoids the above mentioned disadvantage by causing the switching operation to occur as the carriers are moved around one end of the conveyor and before the packages are deposited on the supporting surfaces. At this position there still may be interference between the blade and the cam follower. However, there are no difficulties encountered. The cam follower is pushed out of its normal position for a short time, until the switching blade is properly positioned, then the operation continues in its normal routine. To accommodate this action, a certain amount of resiliency is built into the transverse rods so that they may be bent out of position and then return to normal before the package is received by the carrier.

BRIEF DESCRIPTION OF THE DRAWINGS

FIG. 3 is a view similar to FIG. 2 but showing a cam follower rod making contact with the edge of a switching blade.

FIGS. 4, 5, and 6 are plan views, with some parts in section, of the control mechanism which operates the switch blades. FIG. 4 shows one position where neither one of the blades is actuated by the control means. FIG. 5 shows the mechanism with one control rod operated. FIG. 6 shows the same mechanism but with both control rods operated.

DESCRIPTION OF THE PREFERRED EMBODIMENT

Figure 1:
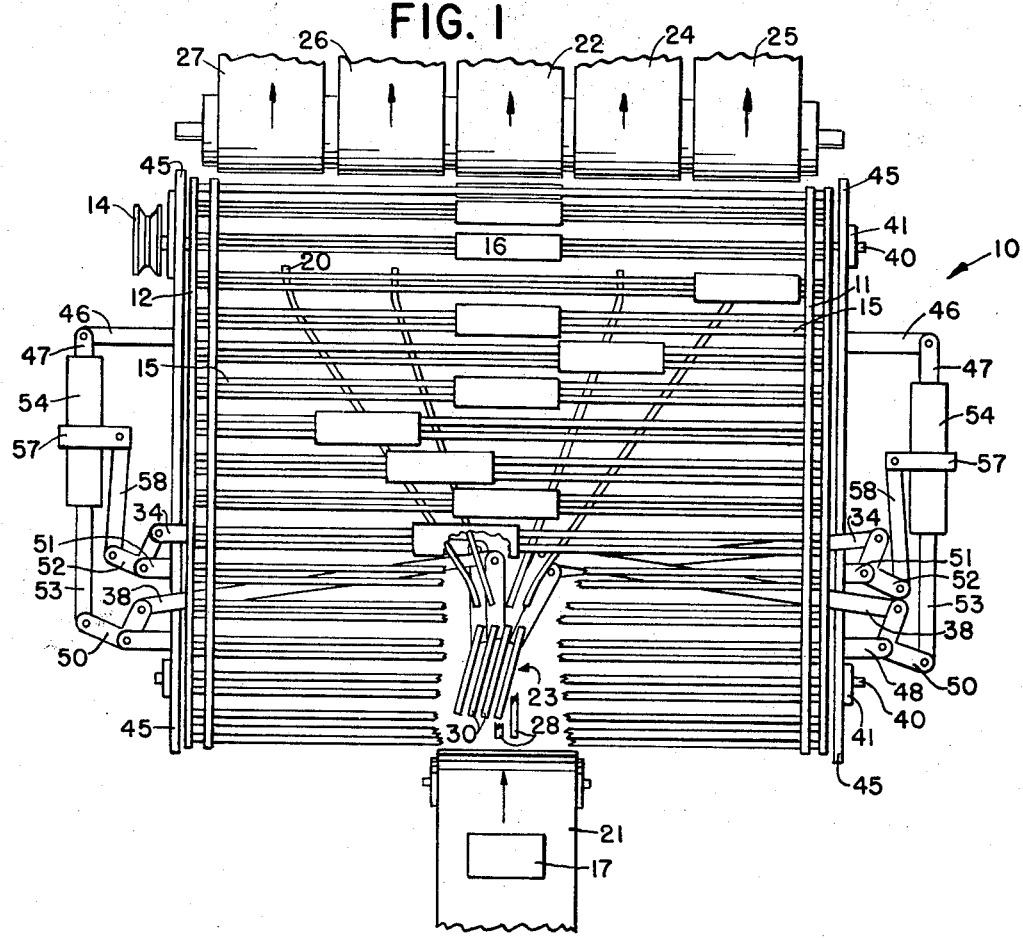
FIG. 1 is a plan view of the conveyor with parts broken away to show the switching device.

Referring now to FIG. 1, a conveyor 10 is shown with switching means for dividing a plurality of packages into five groups. The conveyor comprises two endless chains 11 and 12 mounted on sprocket wheels 13 (FIGS. 2 and 3) and driven by a single pulley 14.

Figure 2:
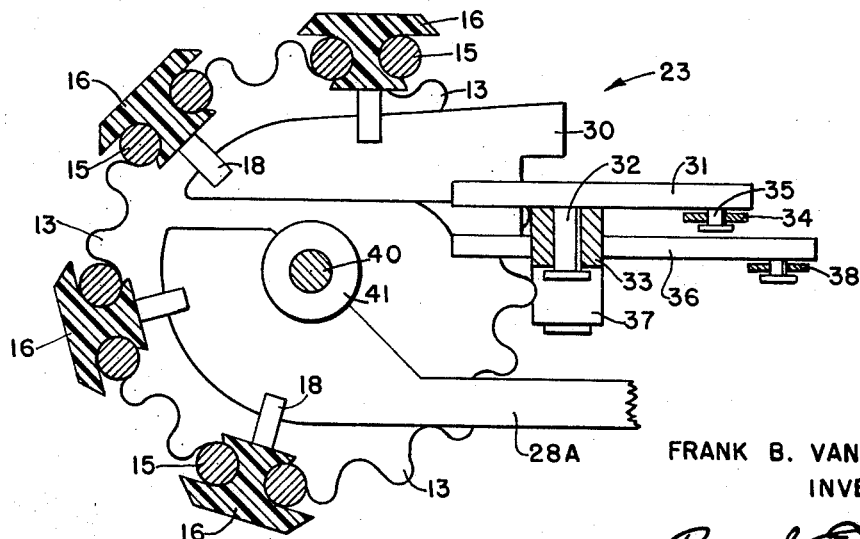
FIG. 2 is a partial cross sectional view taken along a central vertical plane and shows the carriers, the support rods, and one switching blade.

Spaced links in the endless chain are connected to rods 15 which revolve about the sprocket wheels with the links. On each pair of rods 15 a carrier 16 is mounted for conveying packages 17 on top of the conveyor system. A detailed view of the carriers 16 is shown in FIGS. 2 and 3. In these views it is evident that the carrier 16 can be moved transversely of the conveyor motion as they slide on the rods 15. In the middle of each carrier is a short rod 18 which extends from the bottom surface and acts as a cam follower. The rod 18 is engaged by a number of linear extending cams 20. The cams 20 are generally formed in the shape of a square rod and those cams immediately beneath the top conveyor rods 15 are disposed on an angle, as shown in FIG. 1, so that they can push the carriers 16 to any one of four positions.

As shown in FIG. 1, an endless belt 21 brings packages 17 from a weighing machine and deposits them on the carriers which, at the initial position at the front end of the conveyor, are in alignment with the central axis of the machine. If all the packages are within a predetermined desired weight range, they will not be switched to either side of the central position and will travel the length of the conveyor to be deposited upon another endless belt 22 which conveys the packages to a receiving station. If a package 17 is beyond the weight range, it may be deflected by the switching blades 23 to a second position and then be directed by a cam 20 to a second conveyor belt 24. In a similar manner the switching blades 23 may be controlled to send carriers and their packages to belts 25, 26, or 27, this type of selection being old in the art.

After the carriers have delivered their packages to any one of the five endless belts, they move around to the underside of the conveyor and are then controlled by other cam rods (not shown) to move back to a central position. The normalizing cam rods are not shown in FIG. 1 because they are old in the art and do not form any part of the present invention. The carriers are moved to a central position so that they move through a slot 28 indicated in FIG. 1 by the broken guide portions. One of these portions 28A is shown in FIGS. 2 and 3. The slot 28 delivers the cam follower rods 18 to a position where they may be controlled by the switching blades 23. The control and positioning of these blades comprises the present invention and results in a smooth operation which cannot jam because of any interference between the cam followers and the edge portions of the switch blades 23.

Referring now to FIGS. 2 and 3, the switching means 23 includes four blades 30, only one of which is shown in FIGS. 2 and 3. Each blade is mounted on a supporting rod 31 to which is secured a vertical shaft 32 turning in a bearing 33. The other end of the supporting rod 31 is controlled by a rod 34 coupled to rod 31 by means of a stub shaft 35. In a similar manner, a second blade 30 is secured to a supporting rod 36 which is journaled in a bearing 37 and is controlled by a rod 38. The mechanism in FIG. 2 shows only one-half of the switching mechanism, the other half being on the other side of the center line and constructed in a similar manner. The sprocket wheels 13 are connected to a shaft 40 which turns in a bearing 41.

In FIG. 1 all four switching vanes are moved to the left of the center line and a carrier 16 is thereby deflected to the right by means of a cam follower 18. As the carrier moves to the right, it slides along rods 15 and then, when the cam follower leaves the switch blade, it is controlled by the right-hand cam 20 which moves it out to the exterior right-hand position so that it eventually will be adjacent to endless belt 25 and deliver a package to this position. In a similar manner, if the right-hand switch blade is moved to the right by the action of control rod 34, the cam follower will then be controlled by the second blade and the intermediate cam rod 20 to move into an intermediate position and deliver its package to endless belt 24. The other two switch blades 30 are controlled by rods 34 and 38 on the left side of the conveyor and act in a similar manner.

Switch blades 30 are controlled by rods 34 and 38 and the mechanism shown at the extreme right and left of the conveyor. This mechanism, to be described in detail later, acts quite fast to move the switch blades from one position to another but there may be a slight lag in the operation and if a switch blade 30 is caught half way between its two control positions so that a cam follower 18 strikes its edge, the movement of the wheel 13 and rods 15 will then force the cam follower into the position shown at 18A in FIG. 3. In order to accommodate for this action rod 15A must be bent upwardly in the middle to take the position shown. It should be pointed out that the blade 30 is moving to a new position during this interfering action and it soon will move away from the bottom portion of cam follower 18A and the carrier 16 will then snap back into its normal position. This action takes place during the time that the rods and the carriers are moving around the sprocket wheel 13 and not carrying packages which might otherwise weight them down.

Referring now to FIGS. 4, 5, and 6 the switch actuating mechanism is secured to a base plate 45. A supporting stud 46 is mounted near one end of the plate and supports a shaft 47. At the other end of the base plate 45 a second stud 48 is mounted and supports a first bell crank 50. In a similar manner a third stud 51 supports a second bell crank 52. One arm of bell crank 50 is connected to a shaft 53 while the other arm of the same bell crank is connected to control rod 38. The other arm of bell crank 52 is connected to control rod 34.

The actuating means which turns bell cranks 50 and 52 to operate the switch blades 30 is a double ended cylinder 54 having a piston 55 at one end connected to shaft 53 and a second piston 56 in the other end connected to shaft 47. A clamp 57 is secured to the center portion of cylinder 54 and operates a control rod 58 to turn bell crank 52 and operate control rod 34.

FIG. 4 shows the operating mechanism in its unactuated condition with pistons 55 and 56 limiting against an internal shoulder inside the cylinder. When in this position, control rods 34 and 38 are in a position which moves rods 31 and 36 away from the central axis of the conveyor.

FIG. 5 shows the operating mechanism in a condition where compressed air or a fluid such as oil has been applied to the left hand side of piston 55 through a conduit 59.

FIG. 6 shows the same operating mechanism but with compressed air or other fluid applied to the right-hand side of piston 56 so that the cylinder 54, along with piston 55 and shaft 53, are all moved to the right until the piston 56 limits against a shoulder or wall inside the cylinder. This action causes both bell cranks 50 and 52 to be turned and both control rods 38 and 34 are moved in the direction indicated by the arrows. A similar mechanism is mounted on the left side of the machine and controls the positions of the other two switch blades.

In the foregoing description, many items have been omitted, such as electric motors, sources of compressed air, and the sensing means which senses the weight of each article and thereby controls a valve for applying energy to either piston. Descriptions of these structures can be found in prior art patents including the patent mentioned above. These structures do not form a part of the present invention.

Having thus fully described the invention, what is claimed as new and desired to be secured by Letters Patent of the United States is:

1. A conveyor switching device for separating packages into groups, said device including a plurality of flexible conveyor rods coupled to an endless chain for moving the rods in a longitudinal direction toward a group delivery position, and a plurality of carriers slidably mounted on the rods, said carriers each including a cam follower for engaging cam directing means to move the carriers in a transverse direction along the rods to a desired group position; the improvement which comprises a plurality of rockable switching blades for engaging the sides of the cam followers and for moving the carriers to a position for actuation by a desired cam directing means, the leading edge of said switching blades positioned adjacent to the cam followers while they are being moved up from a return plane but before the carriers are moved into a package receiving plane, said leading edges being rounded for making a gradual engagement with the ends of the cam followers when the blades make contact therewith, and means for rocking the blades whenever a group selection is made.

2. A switching device as claimed in claim 1 wherein said cam followers each comprise a single cylindrical stub shaft projecting away from the lower carrier surface.

3. A switching device as claimed in claim 1 wherein said switching blades operate to move the carriers when the carirers have traveled over half the distance from the return plane to the package receiving plane.

References Cited

UNITED STATES PATENTS

| | | |
|---|---|---|
| 3,009,572 | 11/1961 | Seaborn. |
| 3,093,245 | 6/1963 | Worcester et al. _____ 209—121 |
| 3,129,803 | 4/1964 | Giulie et al. |
| 3,277,995 | 10/1966 | Seed _____ 209—121 X |

ALLEN N. KNOWLES, Primary Examiner